United States Patent [19]

Cress et al.

[11] 4,121,402

[45] Oct. 24, 1978

[54] METHODS AND MEANS FOR MANUFACTURING FOAM PLASTIC CONTAINERS AND SIDEWALL BLANKS FOR SAME

[75] Inventors: Allan K. Cress, Baltimore; Charles E. Busse, Jarrettsville, both of Md.

[73] Assignee: Maryland Cup Corporation, Owings Mills, Md.

[21] Appl. No.: 665,617

[22] Filed: Mar. 10, 1976

[51] Int. Cl.² .......................................... B29C 27/14
[52] U.S. Cl. ....................................... 53/452; 53/559;
83/158; 83/408; 93/36.5 R; 93/39 C; 93/39.1 R; 93/44; 93/55.1 R; 93/84 TW; 156/69; 156/88; 156/203; 156/256; 156/264; 156/443; 156/523; 156/556; 156/583; 264/95; 264/266; 264/268; 264/342 R; 264/DIG. 71; 425/324 R; 425/385; 425/388; 425/403; 425/501; 425/DIG. 201; 425/324.1
[58] Field of Search ................. 156/88, 69, 256, 189, 156/262, 583, 264, 556, 203, 523, 201, 443; 83/158, 408; 53/29, 183, 184 R; 93/82, 84 TW, 44, 39.1 R, 55.1 R, 39 C, 36.5 R; 264/DIG. 71, 95, 266, 268, 342; 425/324 R, 385, 388, 403, 455, 501, DIG. 201

[56] References Cited

U.S. PATENT DOCUMENTS

| | | | |
|---|---|---|---|
| 2,431,697 | 12/1947 | Grau | 93/39.1 R |
| 3,066,562 | 12/1962 | Barnett et al. | 83/158 |
| 3,118,800 | 1/1964 | Snelling | 156/79 |
| 3,345,801 | 10/1967 | West | 53/311 |
| 3,495,506 | 2/1970 | Plymale | 93/39 C |
| 3,658,615 | 4/1972 | Ambers | 156/203 |
| 3,967,991 | 7/1976 | Shimano et al. | 156/203 |
| 3,969,173 | 7/1976 | Amberg et al. | 156/203 |

*Primary Examiner*—Edward G. Whitby
*Attorney, Agent, or Firm*—Birch, Stewart, Kolasch and Birch

[57] ABSTRACT

Preprinted rectangular blanks of longitudinally stretch-oriented foam sheet material are formed into cylinders by a continuous folder and seamer and transferred onto mandrels on which they are shrunken by heat to assume the shape of the mandrel. In forming containers, means are provided to place bottom blanks on the mandrels prior to the loading of the cylinders thereon so as to shrink the cylinders to sidewall shapes overlying the bottom blanks. The top curl on containers such as drinking cups and food tubs is formed after shrink forming and the bottom seam of the container is also reinforced by ironing after shrink forming. A method of continuously forcing and filling containers on a continuous in-line basis is also provided.

35 Claims, 21 Drawing Figures

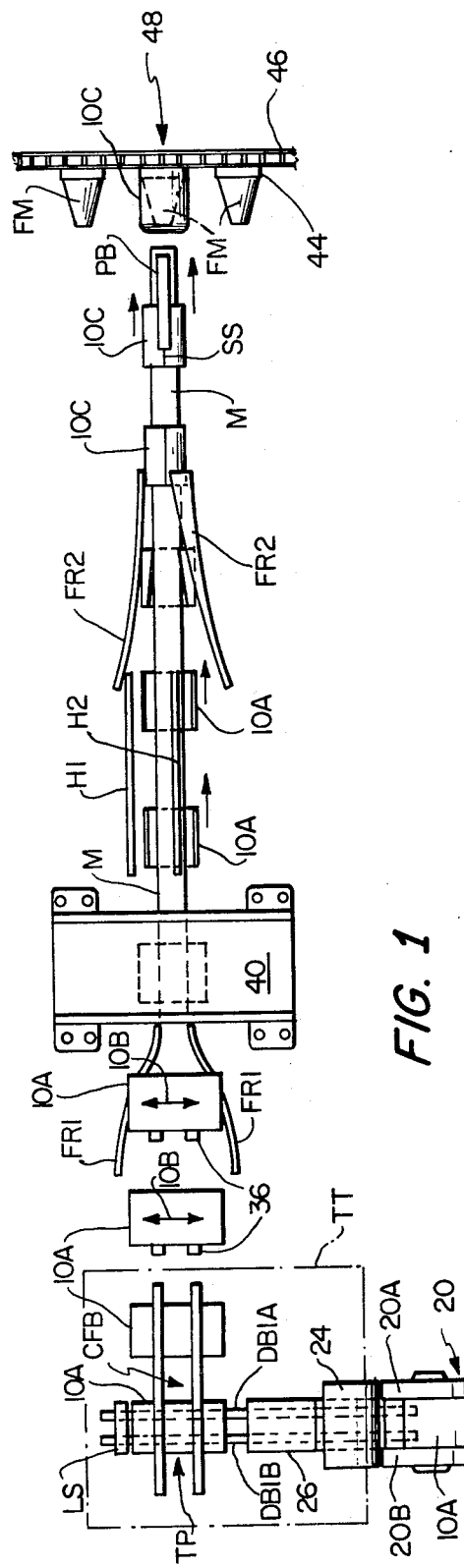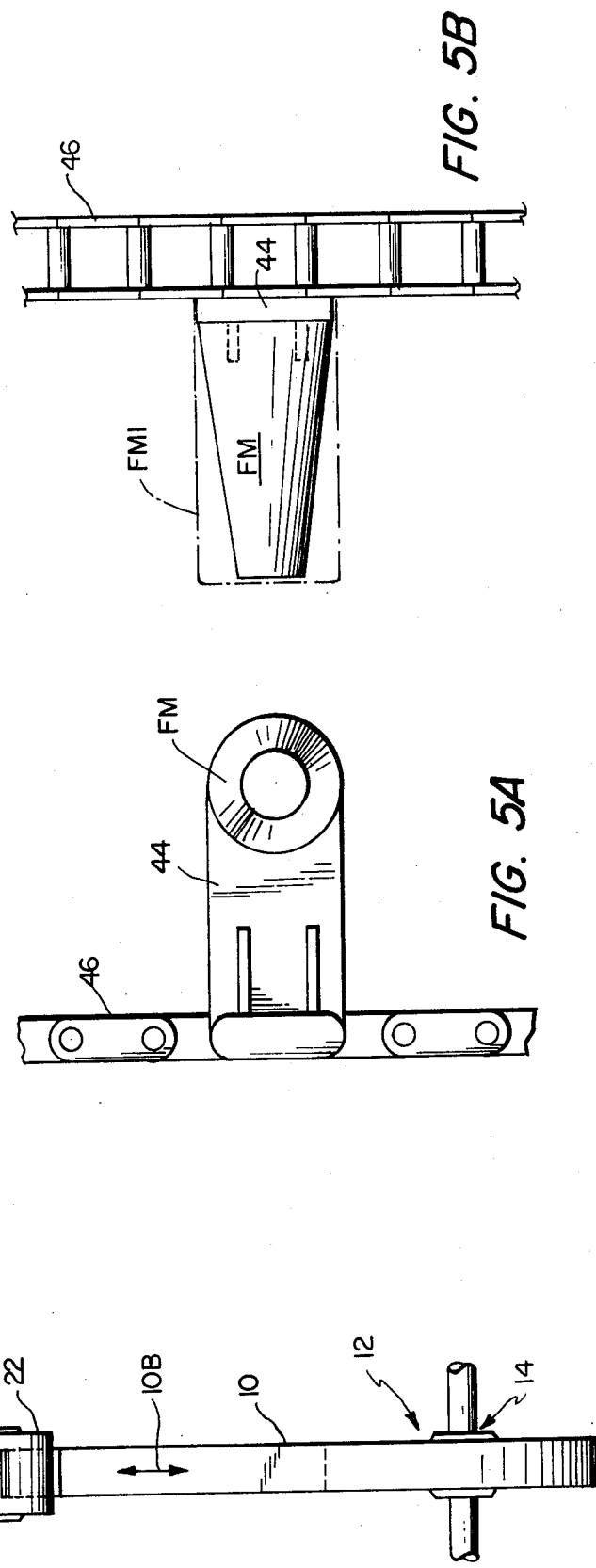

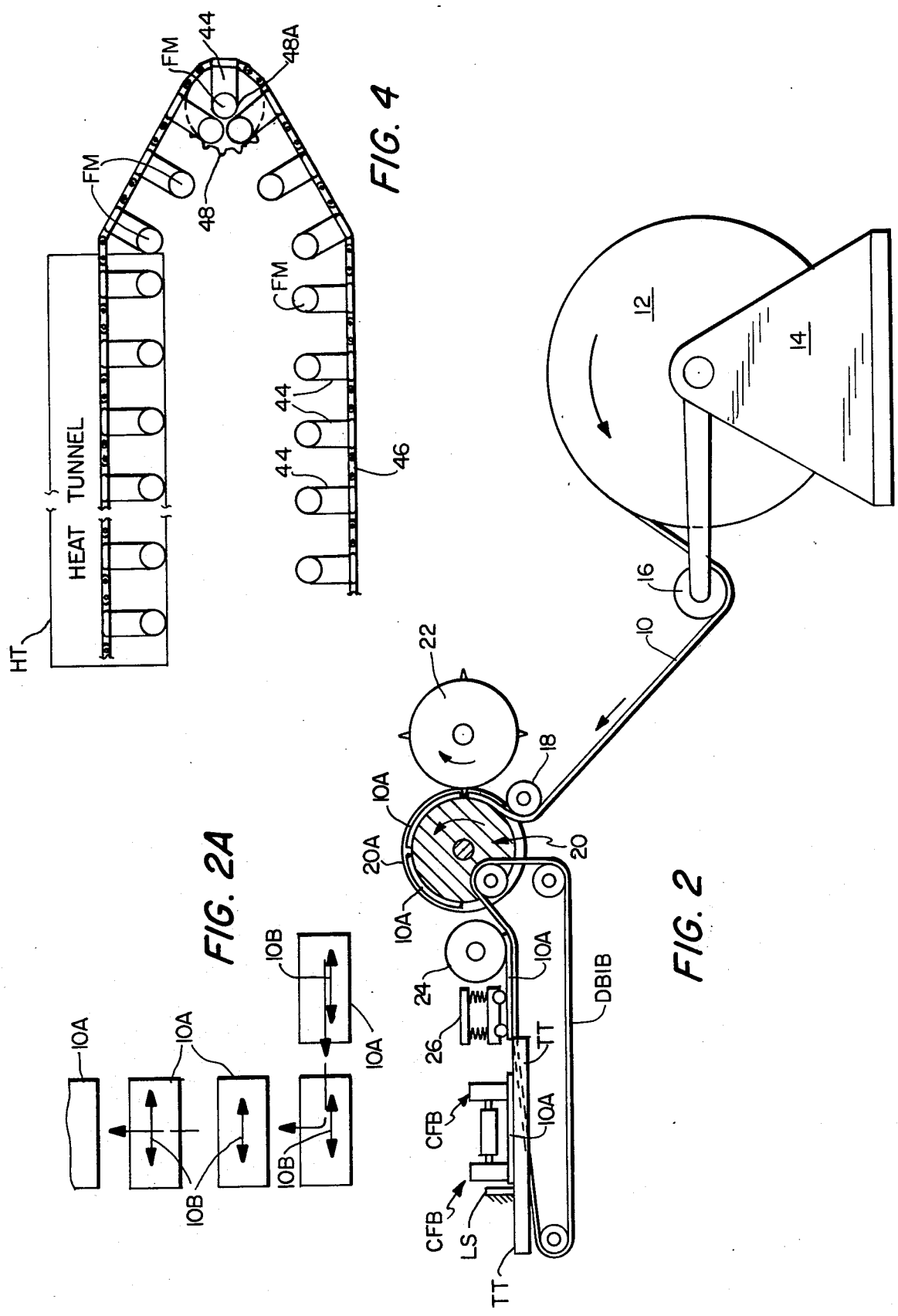

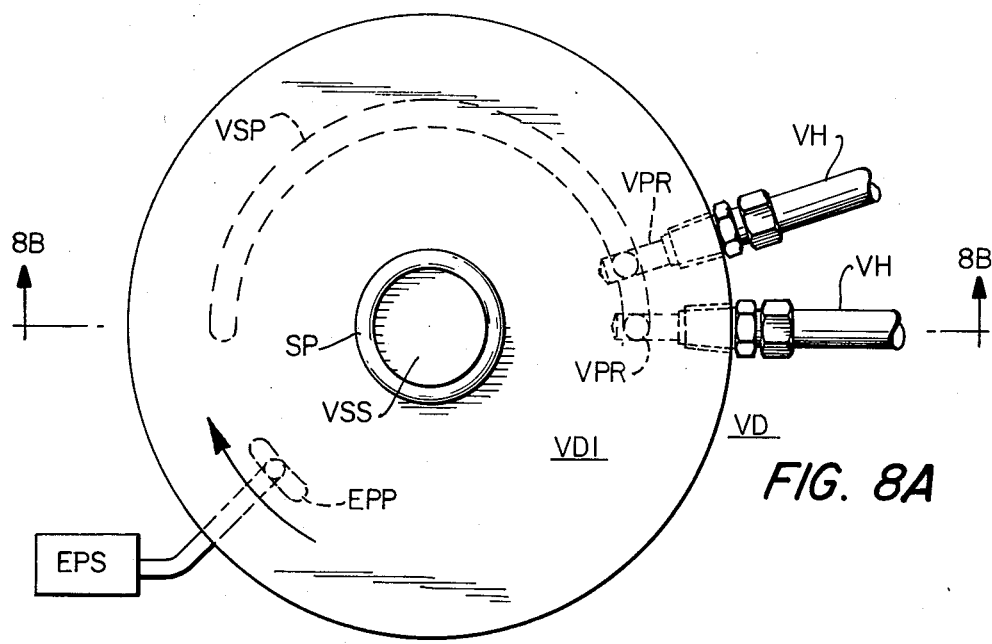
FIG. 8A
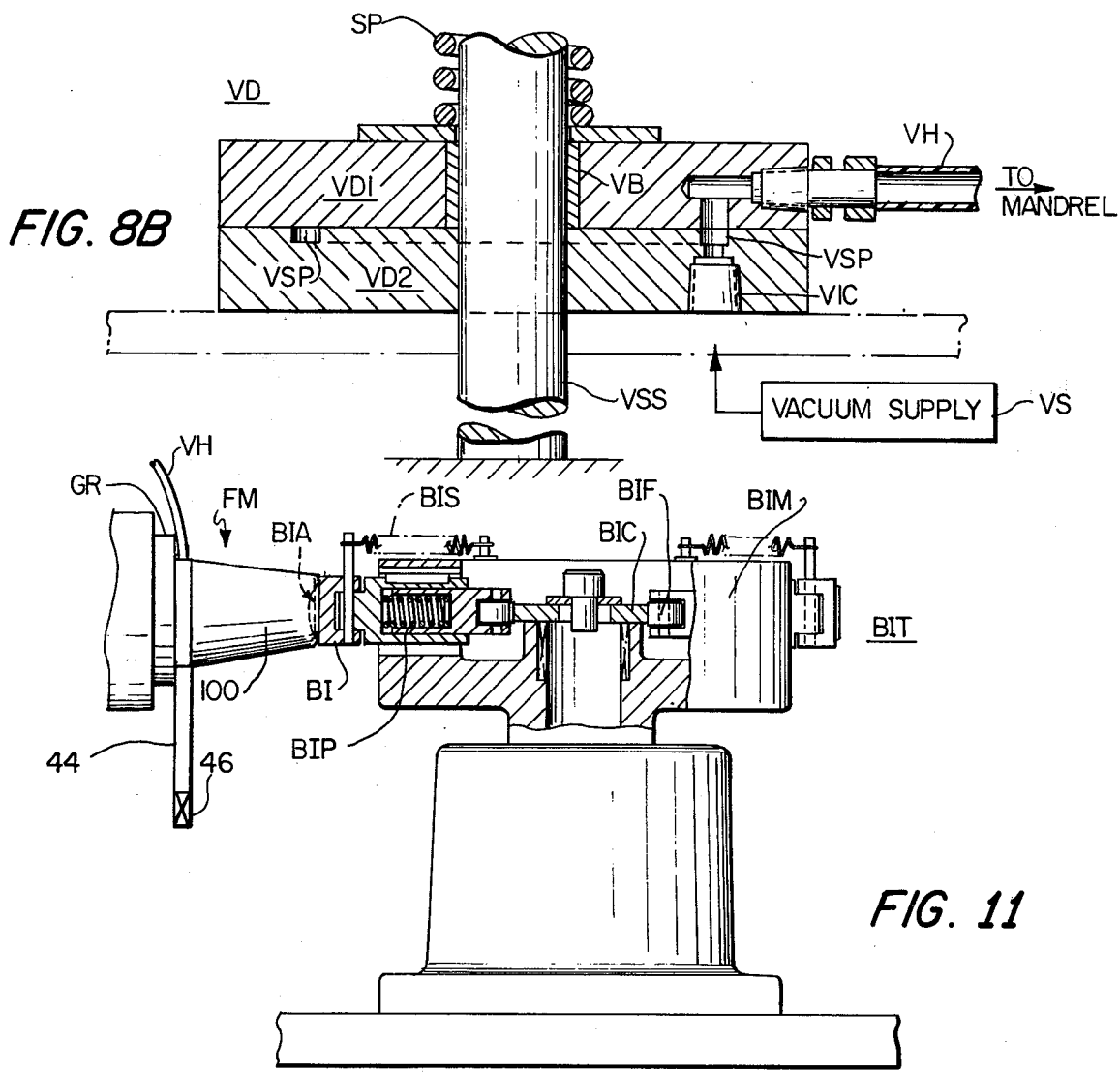
FIG. 8B
FIG. 11

METHODS AND MEANS FOR MANUFACTURING FOAM PLASTIC CONTAINERS AND SIDEWALL BLANKS FOR SAME

FIELD OF THE INVENTION

This invention relates to a method and apparatus for forming containers and more particularly, to a method and apparatus for forming containers from heat-shrinkable material such as foamed plastic sheets and the like.

BACKGROUND OF THE INVENTION

It is known in the art to shrink form containers such as drinking cups from preformed tubular lengths of circumferentially oriented thermoplastic material such as foamed polystyrene.

One particularly desirable method of initially forming a tubular length of such circumferentially oriented material is to provide rectangular-preprinted blanks and wrap these blanks around a mandrel whereon a heat sealed seam is effected longitudinally along the circumference of the formed tubular length. The use of rectangular blanks facilitates pre-printing of patterns, designs, logos, etc. on the blanks such that the ultimate tubular lengths and containers formed therefrom will bear the ultimately desired indicia.

A further advantage of the rectangular blank is that it may be cut from an extruded sheet of thermoplastic or thermoplastic foam which is stretched longitudinally, i.e., in the most logical, natural and facile direction of stretch after extrusion, namely, the machine direction, to achieve the necessary circumferential orientation in a tubular length or cylinder formed from the rectangular blank.

Previous efforts to handle these rectangular blanks and form them into cylinders, however, have required relatively elaborate systems of transfer rollers, turrets with multiple mandrels thereon and vacuum systems to properly index leading and/or trailing edges of the rectangular blanks on the transfer rollers or mandrels.

OBJECTS OF THE INVENTION

It is, therefore, an object of the present invention to provide a new and novel method and apparatus for manufacturing cylinders and shrink-formed containers from rectangular blanks of heat shrinkable plastic material such as foamed polystyrene.

Another object of the present invention is to provide a new and novel method and apparatus for continuously producing shrinkable cylinders from rectangular blanks without the use of multiple mandrels or vacuum holding means for the rectangular blanks.

These and other objects of the present invention will become more fully apparent with reference to the following specification and drawings which relate to preferred embodiments of the present invention.

SUMMARY OF THE INVENTION

A convolute roll of elongated preprinted stock of longitudinally oriented heat shrinkable material such as polystyrene foam sheet is unwound to feed the stock to a rotary cutter which severs the feed stock into the rectangular blanks of substantially identical dimensions. The cut blanks are fed by feed belts on their longitudinal axes to a set of cross-feed belts which laterally entrain the blanks and feed them on their transverse axes by means of pusher dogs through a progressive series of forming rails adjacent a single elongated initial forming mandrel until a tubular length or a cylinder having a lapped side seam is formed about the mandrel by each blank. At this point a heated pressure belt effects a heat sealed side seam and discharge of the cylinder from the initial forming mandrel onto a final forming mandrel indexed to dwell in coaxial registry with the initial forming mandrel and formed cylinder during the discharge of each cylinder from the initial forming mandrel.

The final forming mandrels have bottom and sidewall defining portions and are shaped in cross-section like a desired ultimate container such as a cylindrical food can with a rounded bottom edge or a frusto-conical drinking cup. A bottom blank may be placed on the final forming mandrels and held there by vacuum while the sidewall of the ultimate container, namely, the tubular length or cylinder is transferred from the initial forming mandrel on to the final forming mandrel.

Once both components of the basic container or cup are on a given final forming mandrel, each such final forming mandrel is constrained out of registry with the initial forming mandrel and translated through a heat tunnel to shrink the cylinder or tubular length into conformity with the sidewall slope of the mandrel to provide the desired container shape.

In all cases in the preferred embodiments of the present invention, the cylinders exceed the axial length of the final forming mandrels such that the bottom edge of the sidewall shrinks around the outer edges of bottom blank to provide a heat sealable bottom seam. The final heat sealing is effected by any suitable heating means such as a conformally shaped contact heater.

Where a cup-shaped (frusto-conical) container is desired, a final step in the process is the forming of a top curl or bead to increase the lateral stiffness and drinking comfort of the container. In the case of a food container of a more conventional substantially cylindrical shape, the steps of filling and closing by the application of a suitable lid or closure represent the final steps.

Therefore, the present invention clearly contemplates and provides for the in-line manufacture of containers from heat shrinkable plastic in a food packing line of the type wherein metered charges of food etc. are placed and sealed within a succession of containers presented at a filling station.

Therefore, in food processing plants where food containers for coleslaw, pickled vegetables, potato salad, cottage cheese and other products not pressure packed, no large storage area for containers would be necessary with the present invention.

Instead, rolls of material for a large number of materials could be stored in much less space than that required for containers. Furthermore, since the containers would be made as they are used, the problems of inventories and supply of previously manufactured containers would be substantially obviated.

BRIEF DESCRIPTION OF THE DRAWINGS

FIG. 1 is a top plan view of a blank handling, cylinder forming and cylinder transferring mechanism of the present invention;

FIG. 2 is a side elevation of the feed roll, rotary cutter and right angle transfer belts of the present invention;

FIG. 2A is a top plan schematic illustrating the stretch orientation of cut rectangular blanks as they undergo the right angle transfer from the rotary cutter to the cylinder forming means of the present invention;

FIG. 4 is a schematic side elevation of a forming mandrel drive, transfer station and forming oven of the present invention;

FIG. 5A is a detail of a forming mandrel, mount and drive chain in side elevation;

FIG. 5B is a top elevation of the detail of FIG. 5A with an alternate form of forming mandrel shown in dotted lines therein;

FIG. 8A is a top view of a vacuum distributor of the present invention;

FIG. 8B is a side elevation in cross-section of the vacuum distributor of FIG. 8A taken along line 8B–8B of FIG. 8A;

FIG. 11 is a cross-section of the bottom finishing station taken along line 11—11 of FIG. 9;

DETAILED DESCRIPTION OF THE DRAWINGS

Figure 3:
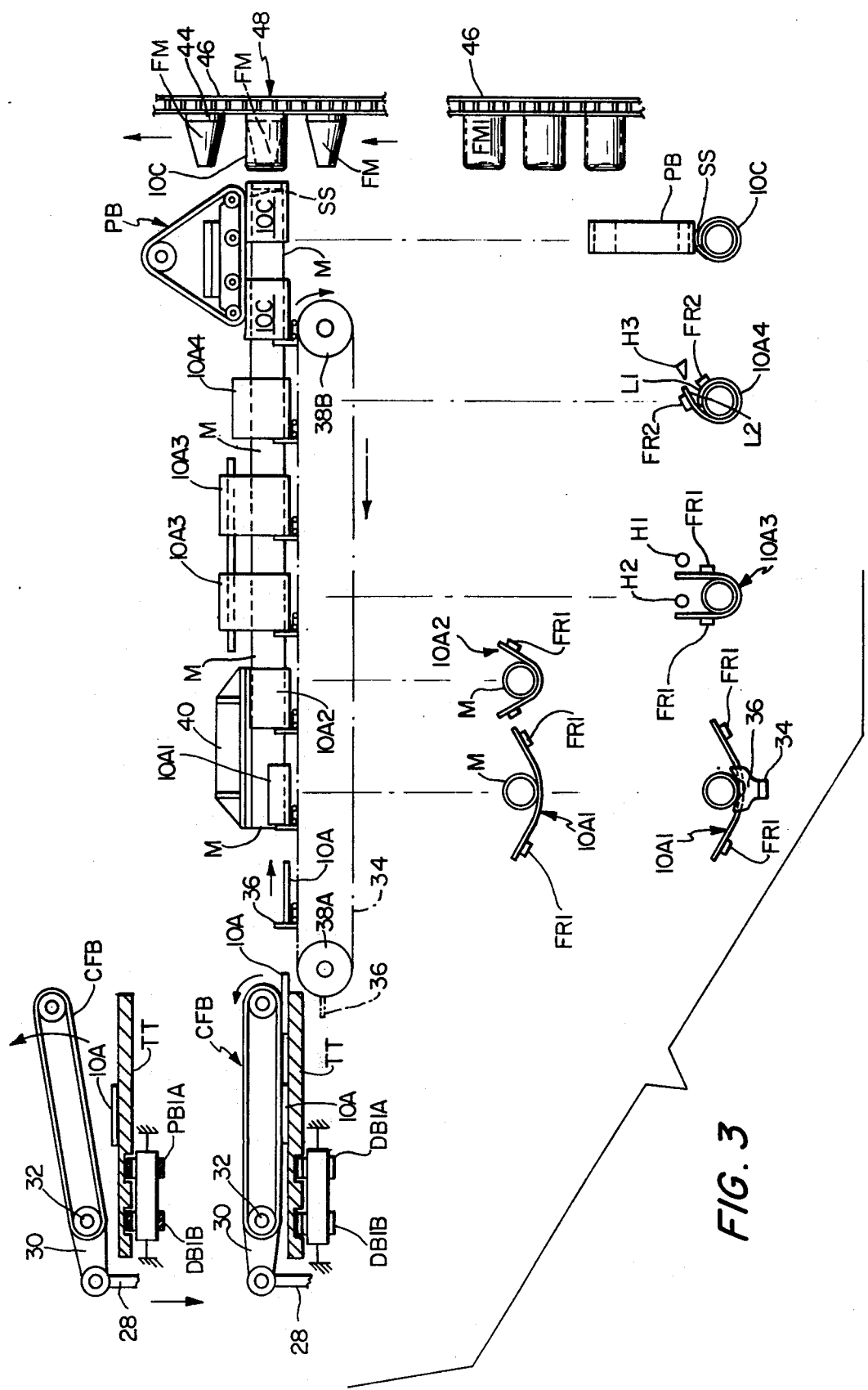
FIG. 3 is an exploded schematic illustrating in correlated cross-section the various forming stages of the present invention in converting a rectangular blank into a cylinder by continuous movement of the blank along a fixed mandrel.

Referring to FIGS. 1 and 2 the material 10 from which the intermediate cylinders and ultimate containers are to be made is shown as an elongated strip convolutely wound in the form of a large supply roll 12 rotatably mounted on a suitable stanchion or support 14.

The feed material 10 is unwound from the supply roll 12 and passed beneath a tension roller 16 (FIG. 2) and a guide roller 18 into contact with a vacuum feed drum 20 which cooperates with a synchronized rotary cutter means 22 to sever the end of the feed material 10 into uniform rectangular blanks 10A.

The feed material 10 is stretch oriented for enhanced heat shrink characteristics in the direction 10B which is parallel to the long dimension of the ultimate rectangular blanks 10A.

As the blanks 10A are released from the downstream side of the vacuum drum 20, the latter being flanged at 20A, 20B to contain the narrower width of the feed material 10 between the flanges 20A, 20B as shown in FIGS. 1 and 2, an upper pinch roll 24 and blank bottom engaging pair of drive belts DB1A and DB1B entrain the leading edge of each successive blank 10A. Each blank 10A is fed on its longitudinal axis by the drive belts DB1A, DB1B beneath a biased retaining guide 26 to a right angle transfer point TP.

At the transfer point TP a set of cross-feed belts CFB are located adjacent a limit stop means LS which abuts with and positions each rectangular blank 10A for lateral transfer by the said cross-feed belts CFB.

The drive belts DB1A and DB1B pass at an angle through suitable slots in the surface of a transfer table TT such that prior to engaging the limit stop LS the blanks 10A have been accelerated by and broken contact with the drive belts DB1A and DB1B.

As shown in FIG. 3, the cross-feed belts CFB are mounted to pivot toward and away from the upper surface of the transfer table TT in synchronism with the forming of the rectangular blanks 10A and their delivery to the transfer point TP. Thus, each said blank 10A will be transferred laterally of its longitudinal axis substantially instantaneously upon engaging the limit stop LS at the transfer point TP.

The pivotal motion of the cross-feed belt assembly CFB is effected by means of a drag link 28 and crank arm 30 acting about a pivot point 32 as illustrated in FIG. 3.

The cross feed belts CFB drive the blanks 10A off the transfer table TT onto a carrier chain 34 having pushers or dogs 36 thereon which engage the trailing edges of the blanks 10A and propel them along in a direction transverse to their longitudinal stretch orientation direction 10B.

Longitudinally disposed along the upper reach of the carrier chains 34 is a hollow tubular forming mandrel M which is fixed against rotation in a suitable holding bracket 40.

Leading into the bracket 40 and progressively varying in shape along the substantially entire extent of the forming mandrel M are opposed forming rails FR1, the extent of which can best be understood with reference to FIGS. 1 and 3.

As the carrier chain 34 progresses clockwise around the chain drive sprockets 38A, 38B, the pusher dogs 36 move the blanks 10A through the forming rails FR1 to bend the blanks 10A in stages 10A1 into a U-shape 10A3 about the mandrel M with the legs of the U-shaped blank 10A3 being adjacent to elongated external and internal surface heaters H1 and H2, respectively, the "external" surface being the outer surface of the innermost lap L1 of a side seam and the "internal" surface being the inner surface of the outer lap L2 of the side seam as shown in the substantially cylindrical fold 10A4 of the blank 10A effected by means of folding rails FR2 downstream from the heaters H1, H2.

A heater H3, schematically shown in FIG. 3 can be utilized to provide additional heat such as be radiation or force hot air between the nearly juxtaposed laps L1 and L2.

When the cylindrical fold is completed the rectangular blank 10A has been converted into a cylinder 10C which exists the folding rails FR2 and passes under a pressure belt assembly PB which applies sufficient downward pressure on the laps L1–L2 to form a heat-sealed lapped side seam SS in the cylinder 10C while at the same time translating the cylinder 10C off the mandrel M and onto a finishing mandrel FM.

Referring to FIGS. 4, 5 and 6, the finishing mandrels FM are shown in solid lines as having a frusto-conical (drinking-cup) shape and in dotted lines as having a substantially cylindrical shape FM similar to that of pressurized aluminum beverage cans.

The finishing mandrels FM are mounted on one end of support arms 44 which are mounted at their other ends on a drive chain 46 which passes about a main transfer sprocket 48 adjacent the finish end of the elongated forming mandrel M. As shown in FIGS. 1 and 3, the finished cylinders 10C are stripped from the forming mandrel M onto one of the finishing mandrels FM which is in substantially coaxial registry with the forming mandrel M.

This registry is achieved by proportioning the transfer sprocket 48 such that the arms 44 are radii thereof and place the finishing mandrels FM one-by-one at the dead center position 48A of the transfer sprocket 48 at the point of coaxial registry with the forming mandrel M. As a result, a time delay during which the finishing mandrel FM remains in such registry is effected, thereby permitting transfer of the cylinder 10C from the forming mandrel M onto the finishing mandrel FM and providing operating leeway for timing adjustments therebetween so that highly accurate synchronization is obviated. This not only reduces the cost of the apparatus but enhances the achievable quality control by minimizing waste due to damaged cylinders during mandrel-to-mandrel transfer caused by mandrel mis-alignment.

Once the cylinders are transferred onto the finishing mandrels FM they are conveyed on those mandrels through a suitable heat tunnel HT, the length of the latter and its temperature being correlated with the speed of the carrier chain 46 to shrink the cylinders to a frusto-conical configuration or a cylindrical configuration depending upon the shape of the finishing mandrel FM or FM1.

The shrinkable sleeves SS are longer than the mandrels FM, FM1 so as to shrink beneath the bottom defining ends of the mandrels (provide the inturned bottom or curl) of a finished container.

Figures 6A, 6B:
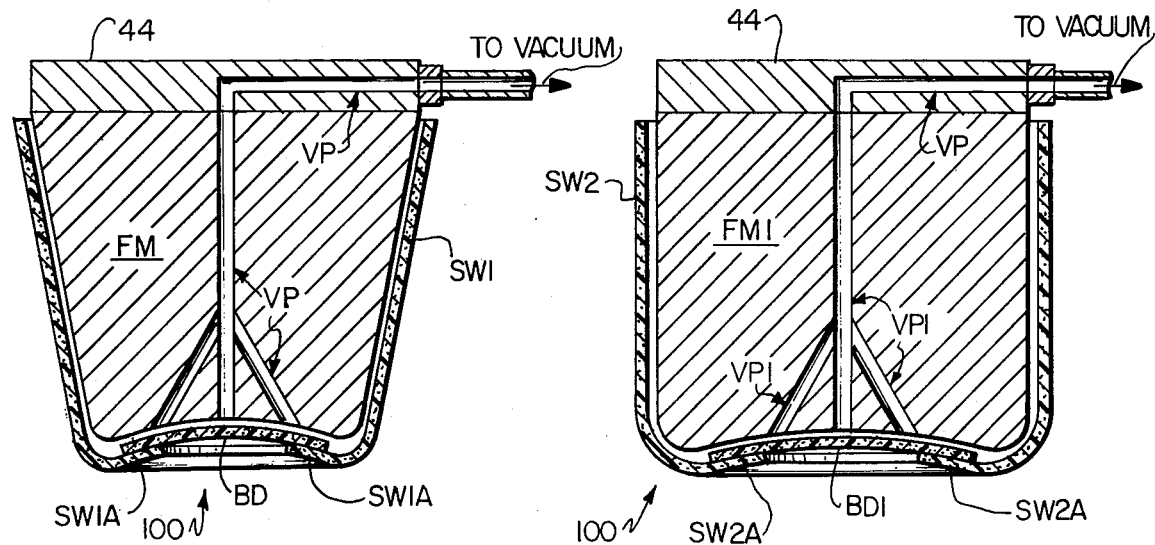
FIG. 6A is a cross-section of a frusto-conical mandrel illustrating internal vacuum ports therein and a container formed thereon.
FIG. 6B is a cross-section of a substantially cylindrical mandrel, illustrating internal vacuum ports therein and a container formed thereon.

For example, as shown in FIG. 6A, a frusto-conical sidewall SW1 is produced by shrinking the sleeves SS on a frusto-conical mandrel FM. A bottom blank BD is provided such that the inturned edges SW1A of the sidewall SW1 will overlap the bottom blank BD after forming the sidewall from the sleeve SS.

The mandrel FM is shown as including internal vacuum ports VP which extend to a vacuum connection VC on the mounting arm 44 of the mandrels as will be more fully described with reference to FIG. 7.

For a container of a more conventional cylindrical shape such as the cross-section of an aluminum beverage can or the like, reference is made to FIG. 6B in which a more cylindrical mandrel FM1 having vacuum ports VP1 is shown with a sidewall SW2 shrink formed thereon with inturned edges SW2A overlapping the periphery of a bottom blank BD1, the latter being initially held on the mandrel via the vacuum ports VP1.

Figure 7:
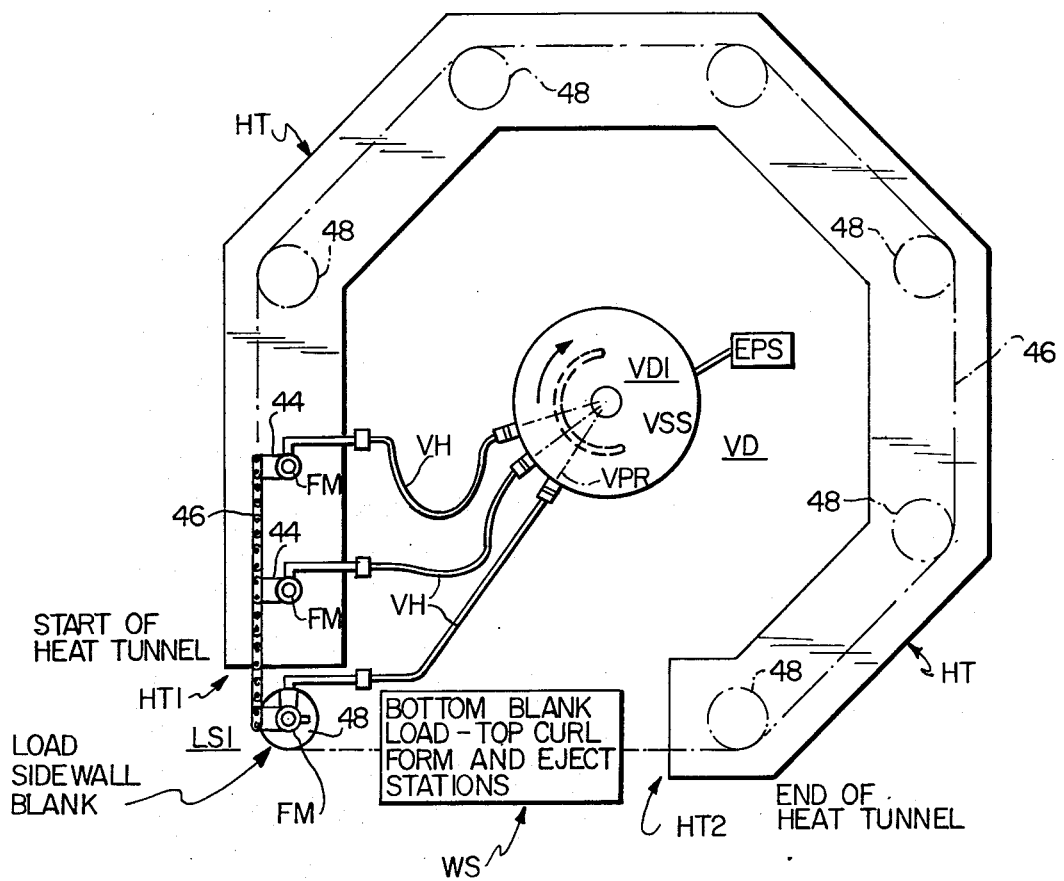
FIG. 7 is a schematic of a cup making system of the present invention.

Referring now to FIG. 7, the finishing mandrels FM (provided with a bottom blank BD as shown in FIG. 6A and to be more fully described with reference to FIGS. 9-11) are loaded with the shrinkable cylinders at a loading station LS1 in the manner previously defined in FIGS. 1-6, and the mandrels FM bearing the sidewall blanks (SW1) are progressively transported through the heat tunnel HT from the entrance HT1 thereof to the exit HT2 on the carrier chain 46 over the drive sprockets 48.

When the mandrels FM leave the exit HT2 of the heat tunnel HT they are carrying formed cups or containers of the configuration shown in FIG. 6A.

These cups or containers are then subjected to bottom sealing and a top curl forming operation as will be described with reference to FIGS. 9-11.

The bottom blanks BD (BD1) of FIG. 6A (6B) are held on the mandrels FM (FM1) by means of vacuum applied through vacuum hoses VH and through the support arms 44 of the said mandrels.

A vacuum distributor VD is provided centrally of the arcuately disposed heat tunnel HT into which all of the vacuum hoses VH are manifolded.

As further shown in FIGS. 8A and 8B, the vacuum distributor VD includes a top rotor plate VD1 having a plurality of radially disposed vacuum ports VPR therein connected one from each of the vacuum hoses VH to a circular locus in the rotor disc VD1 which corresponds in size to the radius of an arcuate vacuum supply port VSP in a fixed bottom plate VD2 through which an input coupling VIC is provided to connect the supply port VSP to a vacuum source VS.

As the mandrels FM travel through the heat tunnel HT, the rotor disc VD1 rotates on a bearing VB on a support shaft VSS and is held in sufficient sealed engagement therewith. The vacuum ports VPR in the rotary disc VD1 thus come into and out of registry with the vacuum supply port VSP in the support disc VD2 causing vacuum to be applied through the hoses VH to the vacuum ports VP (VP1) in the mandrels FM (FM1) to provide the suction required to hold the bottom blanks BD (BD1) in place on the said mandrels pending the shrink forming of the sidewall blanks SW1 (SW2) to overlap the bottom blanks BD (BD1) at the inturned portions SW1A (SW2A) of the said sidewall blanks.

The arcuate length and position of the vacuum supply port VSP are thus correlated with heat shrink process and extent of travel of the mandrels FM (FM1) in the heat tunnel HT from the time the bottom blanks BD (BD1) are loaded on the said mandrels until sufficient shrinkage of the sidewalls SW1 (SW2) has been achieved to hold the said bottom blanks in place.

Also provided in the fixed bottom disc VD2 is an ejection pressure port EPP fed from and ejection pressure supply source EPS. The ejection pressure port EPP is positioned to time the application of positive pressure through vacuum ports VPR, vacuum hoses VH and vacuum ports VP (VP1) in the mandrels FM (FM1) to eject finished containers therefrom at the ejection portion of the work station WS as will be more fully described with reference to FIGS. 9 and 10.

Figure 9:
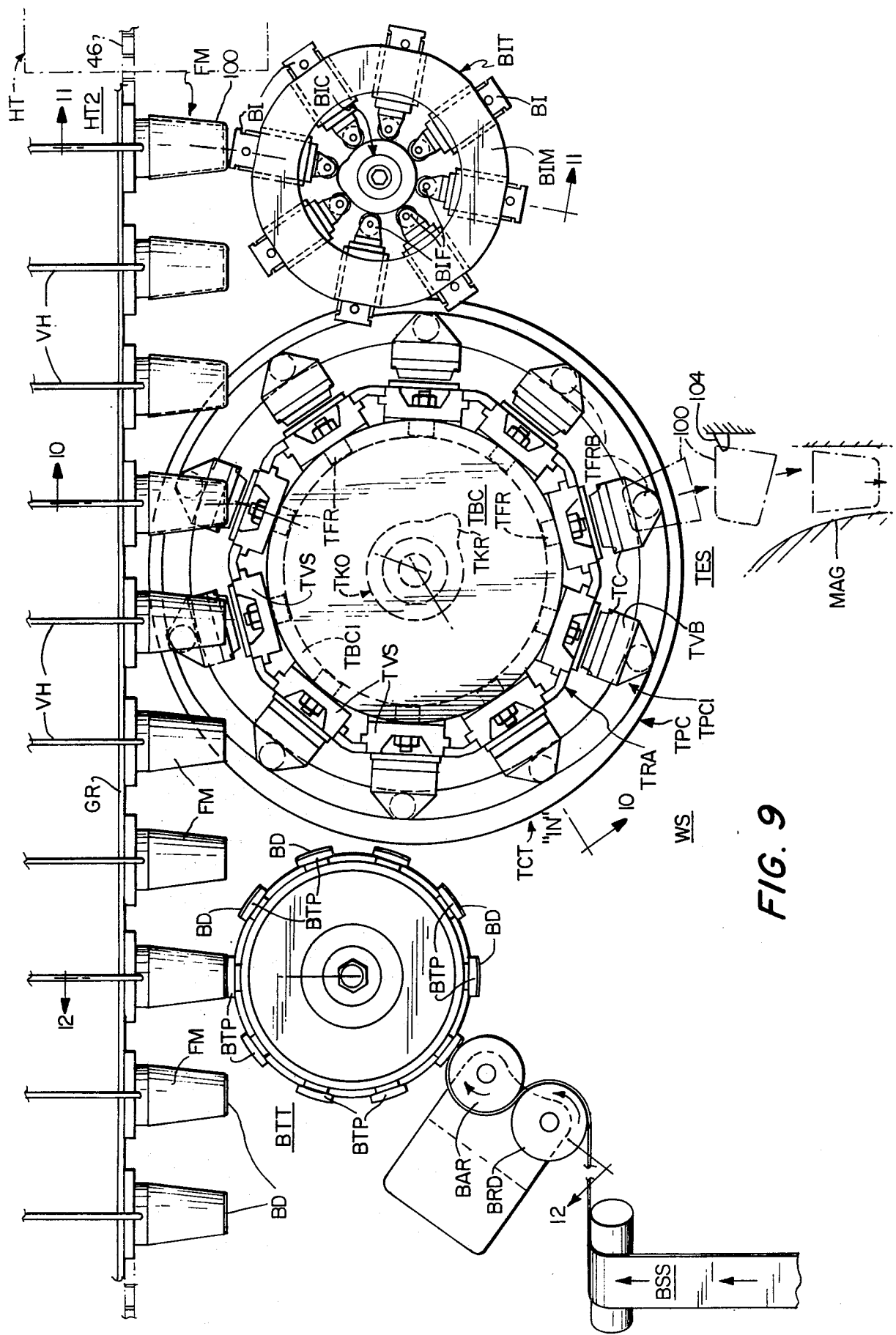
FIG. 9 is a top plan view of bottom finishing, top curl forming and container ejection stations for cup making equipment of the present invention together with a bottom blank feeding station.

Referring to FIGS. 7 and 9, a bank of work stations WS is shown including bottom blank loading, top curl forming, bottom sealing and ejection functions.

As specifically shown in FIGS. 9 and 11; the chain carried mandrels FM are passed along a juxtaposed guide rail GR as they exit the heat tunnel HT at HT2.

The guide rail GR provides a thrust backing to cooperate with a bottom ironing turret BIT having bottom irons BI in a radial array with peripheral spacing therebetween on the said turret corresponding to the spacing between adjacent finishing mandrels FM on the chain 46.

The bottom ironing turret BIT includes a rotating toroidal mounting BIM for the bottom irons BI in which the latter are radially reciprocable. A central cam BIC is provided which constrains the bottom irons BI to engage with the bottom of formed cups or containers 100 on the finishing mandrels FM by means of cam follower wheels BIF and return springs BIS (FIG. 11).

Bottom sealing pressure is regulated by a compression spring BIP mounted in a telescoping section of the bottom iron BI in opposition to the return spring BIS to prevent the bottom irons BI from engaging the bottoms of the containers 100 on the mandrels FM with more than a predetermined maximum sealing force.

Figures 11A, 11B, 12:
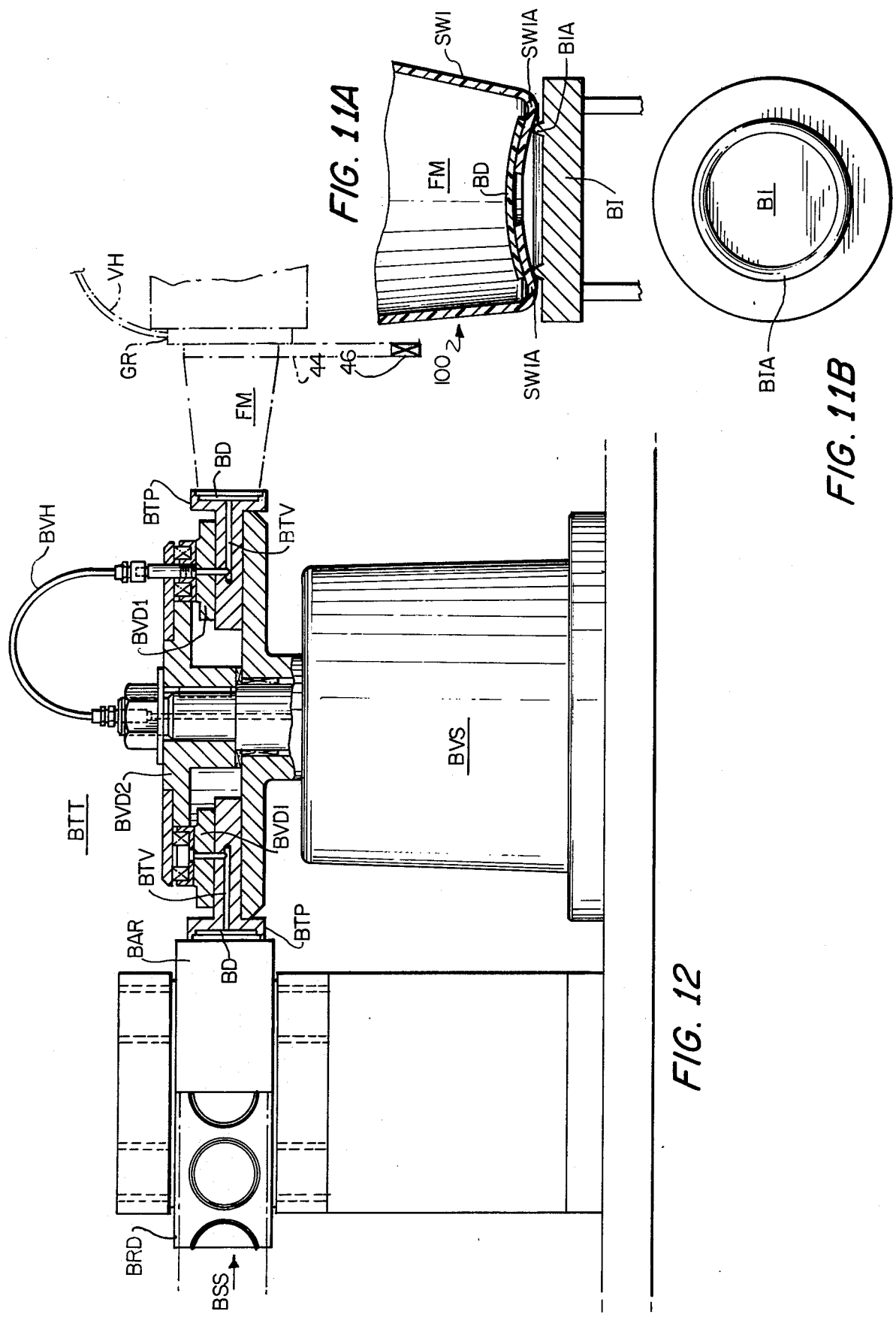
FIG. 11A is an enlarged cross-sectional illustration of a bottom iron engaging a container bottom on a mandrel of the present invention during bottom sealing.
FIG. 11B is a top plan view of the bottom iron of FIGS. 9, 10, 11 and 11A.
FIG. 12 is a cross-section taken along line 12—12 of FIG. 9.

As shown in FIGS. 11A and 11B, the bottom iron BI is configured with a raised annular boss BIA dimensioned to press into the inturned edges SW1A of the sidewalls SW1 of the finished cups or container 100 on the mandrel FM at a point at which the bottom blank BD is overlapped to enhance the seal therebetween and insure a liquid tight container bottom structure.

Depending on the properties of the shrinkable foam material and bottom blank material the heat of the shrinking process may provide sufficient heat to form an annular heat seal on the bottom of the containers 100 or the bottom irons BI can be heated to supply additional sealing heat.

As known in the art other heating means, adhesives, solvents or the like may also be used to enhance the ultimate bond between the inturned portions SW1A (SW2A) of the sidewalls SW1 (SW2) of the containers 100 and the bottom blanks BD (BD1).

A purely heat sealed bond is the preferred embodiment, however.

Figure 10:
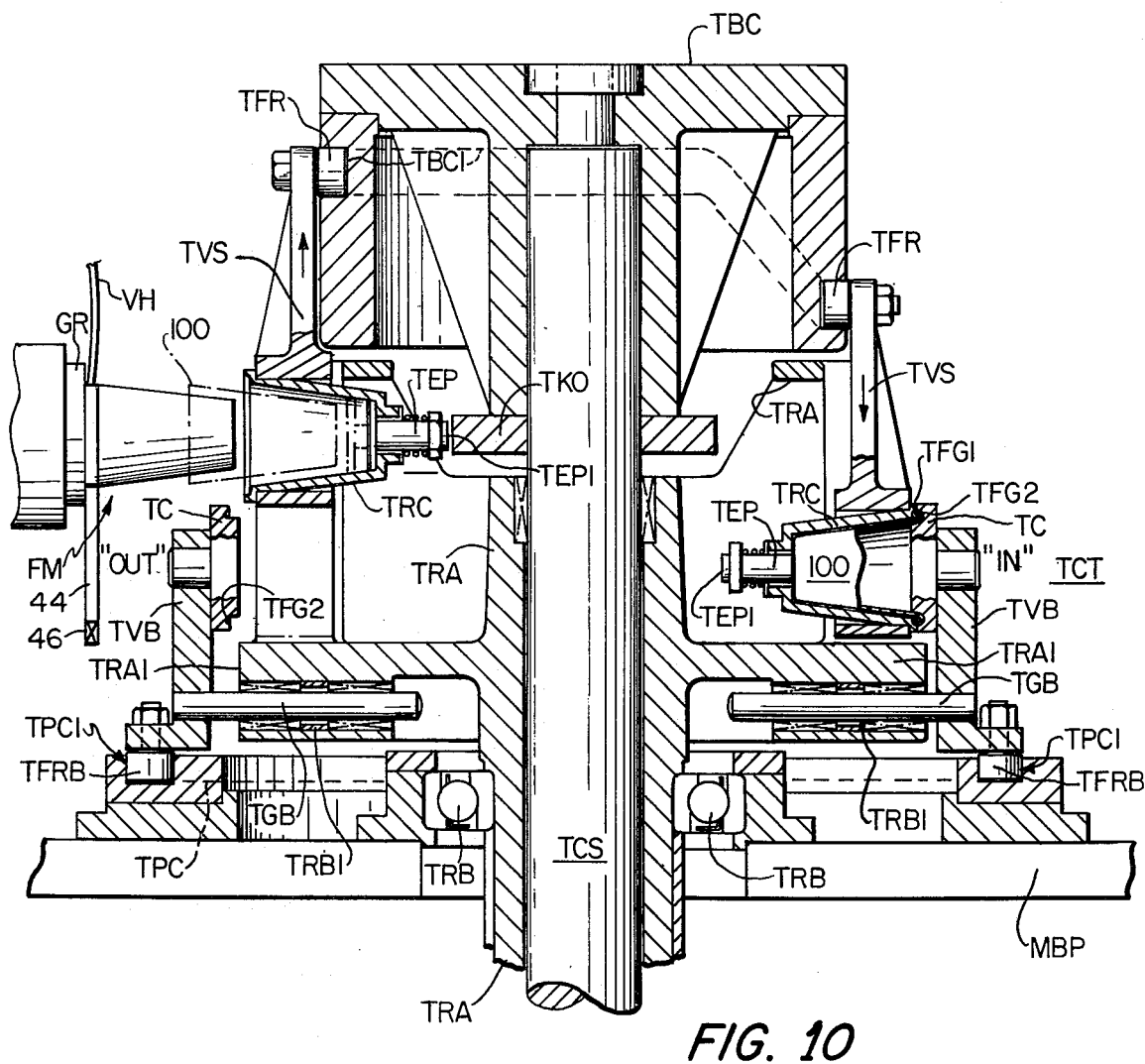
FIG. 10 is a cross-sectional view of the top curl forming station taken along line 10—10 of FIG. 9.

Referring to FIG. 10 in addition to FIG. 9, a top curl forming turret TCT is shown adjacent to the bottom ironing turret BIT for receiving finished cups or containers 100 ejected from the finishing mandrels FM and forming a top curl thereon, i.e., rolling the top rim outward on itself as is a well known practice in the cup and container art.

The top curl turret TCT is shown as including a centrally located barrel cam TBC having a cam track TBC1 in which a plurality of follower rollers TFR ride to constrain vertical movement to respective ones of a like plurality of vertical slides TVS on which are mounted radially disposed and outwardly opening cups receiving cavities TRC.

The barrel cam TBC is coaxially and fixedly mounted on the upper end of a non-rotating central shaft TCS for the turret TCT the said shaft TCS being journaled through a hub assembly TRA which is mounted for relative rotation to the shaft TCS on a machine base plate MBP in bearing means TRB.

The hub assembly TRA provides outboard slots for the vertical slide members TVS and an annular plate TRA1 beneath which a plurality of radially disposed bearing means TRB1 are provided to receive reciprocating guide bars TGB for top curl forming tools TC mounted one in registry with each cup receiving cavity TRC on vertical bars TVB each extending upward from respective guide bar TGB and a cam follower roller TFRB engaging a cam track TPC1 in an annular plate cam TPC fixedly mounted on the machine base plate MBP.

Between the hub assembly TRA and the barrel cam TBC on the central shaft TCS is an annular kick-out cam TKO having a single kick-out rise TKR at a desired ejection station position TES (FIG. 9) to effect ejection containers 100 from the cavities TCR.

The kick-out cam TKO is engaged in the uppermost positions of the container cavities TRC and vertical slides TVS by the inboard tips TEP1 of ejection pin assemblies TEP which are spring biased to telescopically reciprocate in and out of the base of the container receiving cavities TRC to eject finish cups or containers 100 therefrom by a plunger action induced by the knock-out cam TKO.

Figure 10A:
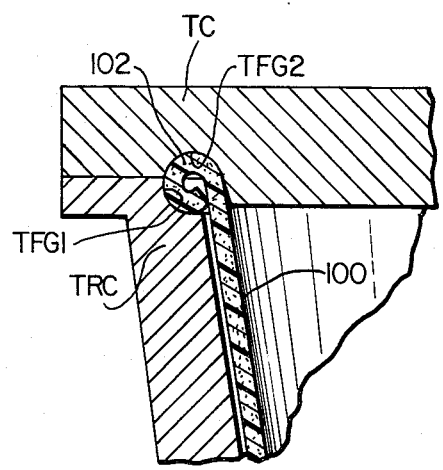
FIG. 10A is an enlarged view of the top awl tool.

Referring additionally to FIG. 10A, the top curl tool TC is shown in the "IN" position as constrained by the plate cam TPC to cause mating top curl forming surfaces TFG1 in the periphery of the cavities TRC and TFG2 in the top curl tool TC to force the top of each container 100 into the curled configuration 102 shown in FIG. 10A and at the "IN" position of the top curl tool TC in FIG. 10.

Thus, in operation, rotation of the hub assembly TRA on the central shaft TCS causes coordinated vertical movement of the slides TVS and the receiving cavities. TCR and radial movement of the curling tools TC to maximum height and radially outward positions, respectively, at the "OUT" position in FIG. 10 and minimum height and innermost radial positions, respectively, at the "IN" position of FIG. 10.

This is effected by the coordinated shapes of the cam tracks TBC1 and TPC1 on the barrel cam TBC and plate cam TPC, respectively.

In the "OUT" position of the top curl tool TC, the receiving chamber TCR is shown in FIGS. 9 and 10 as being indexed to receive a cup or container 100 from the finishing mandrel FM as ejected therefrom by positive pressure in the vacuum hose VH.

The hub assembly TRA rotates in synchronism with the travel of the mandrels FM on the chain 46 and the receiving chambers TRC bearing a container 100 progress toward the "IN" position of FIGS. 9 and 10 in which the curling tool TC has been brought into juxtaposed registry with the receiving cavity TRC to form the top curl 102 on the container 100 (see FIG. 10A).

Subsequently, the tool TC and the receiving cavity TRC separate rapidly and the latter rapidly rises under control of the barrel cam TBC to engage the inboard end TEP1 of the ejection plunger TEP with the kick-out cam TKO and the ejection rise TKR thereon at the ejection station TES (see FIG. 9).

This ejects the containers 100 into engagement with an inverting detent 104 in a magazine chute MAG such that the finished containers are magazined in an upright position.

Prior to the placing of the cylinders 10C onto the finishing mandrels FM (FM1) a bottom blank or disc BD must be placed on the outboard end of the said mandrels to be held thereon by vacuum in the vacuum lines VH from the vacuum distributor VD as previously shown in FIGS. 6A, 6B, 8A and 8B.

To accomplish this function, a supply of bottom blanks BD and a means for transferring them from the supply to the finishing mandrels FM (FM1) must be provided.

To this end, referring jointly to FIGS. 9 and 12, bottom strip stock BSS is fed to a rotary die roller BRD and anvil roll BAD to cause the die roller to cut discs BD from the strip stock BSS and present it to a bottom transfer plate BTP on a bottom transfer turret BTT adjacent to the anvil roll BAD and indexed therewith to pick up each bottom disc BD as it is cut.

The bottom transfer plate BTP bearing the bottom disc BD is eventually indexed into registry with a passing finishing mandrel FM (FM1) and transferred thereto.

The initial pick up of the bottom disc BD by the transfer plate BTP is made by vacuum applied via a vacuum port BTV through vacuum distributors BVD1 and BVD2.

The distributor BVD1 rotates with the bottom transfer plates BTP on the turret BTT while the distributor BVD2 remains stationary.

Vacuum is supplied through a vacuum hose BVH from a vacuum supply source BVS in the base of the turret BTT. The fitting of the hose BVH to the fixed distributor BVD2 acts as a valve to provide vacuum to the ports BTV at all locations via the distributors BVD1, BVD2 except at the right hand position shown in FIG. 12 for the bottom transfer plates BTP. In this position, there is no vacuum in the line BTV and the vacuum from the hose VH in the finishing mandrel FM, now coaxially indexed with the bottom transfer plate BTP will act to strip the bottom disc BD from the plate BTP and onto the base of the mandrel FM.

IN-LINE FILLING OF CONTAINERS AS THEY ARE MADE

As the finished containers 100 enter the magazine MAG at the ejection station TES of the top curl turret TCT, the containers can be fed, one by one, as known in the art to diallike feeder discs 104 which are indexed by a shaft 106 to feed the containers 100, one-by-one to a container filling station 110 where food product 112 in a measured amount is discharged into the container 100. The container 100 is elevated at a pedestal 108 to the filling station 110, which pedestal withdraws to return the container to rest in the dial 104 on its top curl 102.

The container 100 with food 112 is then transferred to another station where a lid 114 is pressed onto the top curl 102 of the container 100 by a seating jig 116 as will now be described with reference to FIG. 14.

The jig 116 is provided with an ejection plunger 118 to eject the lid and container from the jig 116 after seating is completed. An air gap 120 is maintained between the plunger 118 and the lid 114 in the event that vacuum is needed to initially retain the lid 114 in the jig 116.

A plurality of shaped pressure rollers 122 such as schematically illustrated, are spaced around the top curl 102 and produce a curved seam 114R between the top curl 102 and the lid 114.

A pedestal 108A is utilized to transfer the filled container 100 from the dial 104 to the lid seating jig 116.

Figures 13, 14, 15:
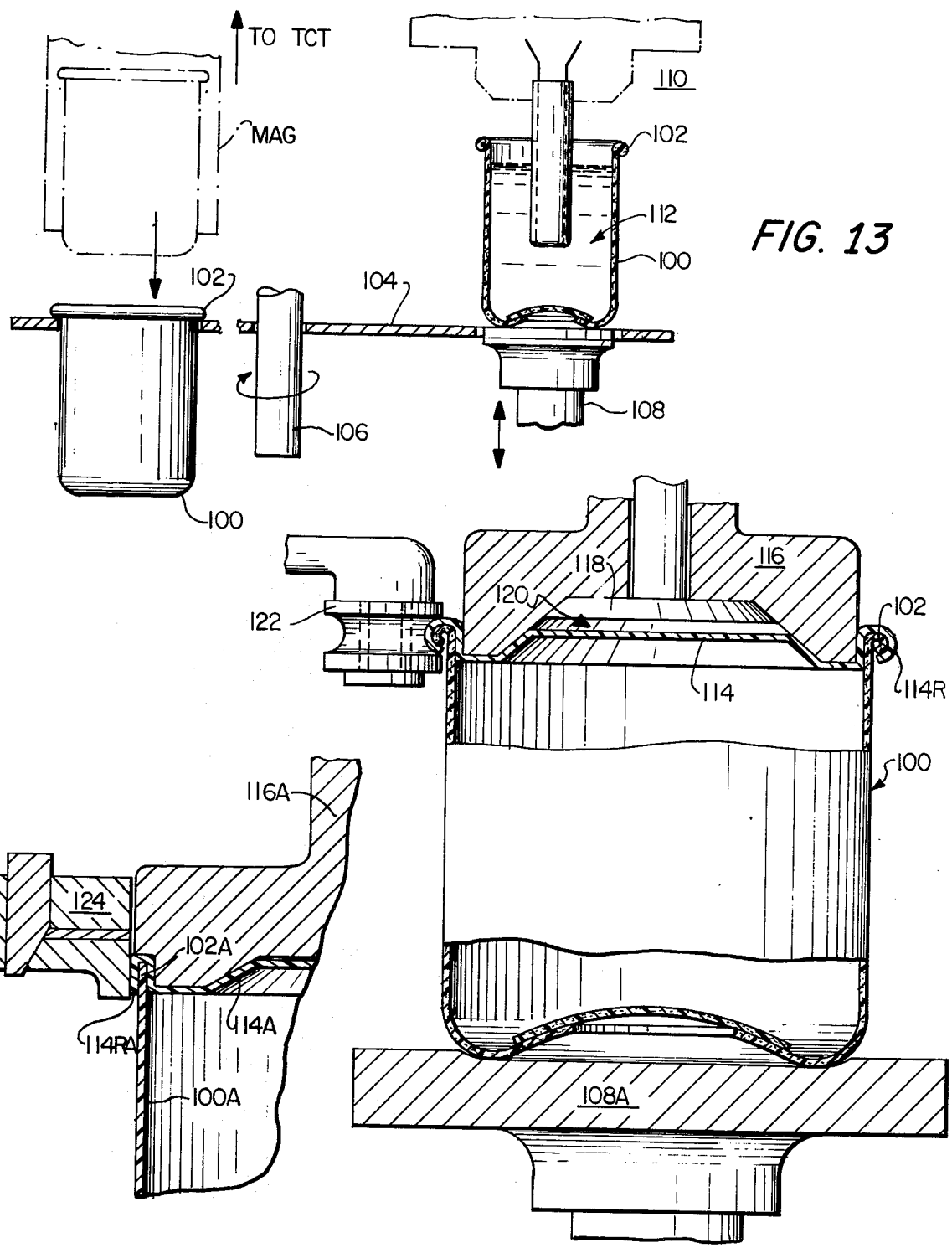
FIG. 13 is a schematic of a container filling station.
FIG. 14 is a schematic of a filled container capping station.
FIG. 15 is a schematic of a filled container capping station illustrating a different cap or lid from that illustrated in FIG. 14.

An alternate embodiment for seating a lid 114A on a container 100A, having an uncurled top edge 102A, by means of a top edge overlap 114RA on the lid 114A, clinched in place by segmented jaws 124 in cooperation with a seating jig 116A is shown schematically in FIG. 15.

Rotary transfer dials 104 and pedestals 108 and filling stations 110 such as those shown in FIG. 13 are known in the art.

For example, U.S. Pat. No. 3,225,899 for Machine For Packaging Food Products of J. B. West, issued Dec. 28, 1965 and U.S. Pat. No. 3,345,801 for Auxiliary Unit For Packaging Machine to J. B. West, issued Oct. 10, 1967 illustrate container filling, capping and handling machines of the type generally described with reference to FIGS. 13, 14 and 15.

With the present invention, cans and containers can be made as needed and no storage of completed containers is necessary in conjunction with a given canning or packaging run.

Only rolls of sidewall and bottom blank material need be stored to effect a supply of containers for holding a given volume of food product.

This also permits the use of non-nestable container shapes which heretofore have been undesirable because of their bulk in an unfilled condition. Once filled, of course, even nestable containers assume such bulk in storage.

Thus, with the continuous container manufacturing method and means of FIGS. 1-12, feeding the continuous filling and capping equipment typified by FIGS. 13-15, an extremely efficient operation is provided which requires only a minimum of warehouse space for the containers required.

SUMMARY OF CONTAINER MAKING OPERATION

As illustrated in FIGS. 1-3, foam plastic strip stock, stretch oriented on its length 10B, is cut into rectangular blanks 10A and transferred transversely of its length 10B through continuous folding means M, H1, H2, FR1, FR2 and a heat seaming means PB to form seamed cylinders 10C circumferentially stretch oriented.

The cylinders 10C are placed over finishing mandrels FM (FM1) having bottom blanks BD already in place from a bottom transfer turret BTT (FIGS. 9, 12).

A chain drive 46 (FIGS. 1, 3, 7, 9) carries the mandrels FM (FM1) through a heat shrink tunnel causing the cylinders 10C to shrink and assume the shape of the mandrels FM (FM1) as shown in FIG. 6A/6B). The sidewalls SW1 (SW2) shrink beneath the mandrels FM (FM1) to place annular overlapping portions SW1A (SW2A) over the outer edges of the bottom disc BD (BD1) as further shown in FIG. 6A (6B).

As the mandrels FM (FM1) bearing shrink formed containers 100 leave the heat tunnel HT (FIGS. 7, 9, 10, 11) bottom seams are formed in the overlap by bottom irons BI on a bottom ironing turret BIT in a manner most specifically illustrated in FIGS. 11A, 11B.

The top curl 102 is then formed on the containers 100 by discharging them from the mandrels FM (FM1) into the receiving chambers TRC of the top curl forming turret TCT which, as shown in FIG. 10A, places a top curl 102 in each container 100 with top curl tool TC.

Subsequent to the forming of the top curl 102, the container 100 is ejected from the top curl turret TCT at an ejection station TES, inverted to proceed bottom first into a magazine MAG and thus placed in readiness for either packaging or for processing in filling equipment.

The present invention may be modified as would occur to one of ordinary skill in the art without departing from the spirit and scope of this invention.

We claim:

1. The method of forming heat-shrinkable cylindrical blanks from longitudinally stretch oriented rolled lengths of foam plastic sheet material comprising:
   feeding said lengths from a roll and cutting same into like rectangular blanks said orientation in the longitudinal direction thereof;
   conveying said blanks transversely of said longitudinal direction while progressively folding and advancing said blanks about and along an elongated cylindrical mandrel until the ends of said blanks overlap on said mandrel to form cylindrical blanks each having a longitudinal side seam defined by said overlap and with said orientation directed circumferentially of each said blank;

applying heat to said ends of said blank during the advancement thereof along said mandrel;

applying pressure along said heated overlapped ends to seal said side seam and complete each said cylindrical blank on said mandrel; and ejecting said finished cylindrical blank from said mandrel subsequent to sealing said side seam.

2. The method defined in claim 1, wherein said blank includes printed graphics on one face thereof and including the step of orienting said blank such that said graphics appear on the outer circumference of said cylindrical blank.

3. The method of forming a cylindrical blank from a rectangular blank of foam plastic sheet material comprising:

providing a rectangular blank of a width equal to the desired length of a cylindrical blank and a length equal to the desired circumference;

conveying said rectangular blank in a direction parallel to its width dimension along the length of a fixed cylindrical mandrel and continuously and progressively heating and folding the ends of said rectangular blank upon themselves on said mandrel while conveying said blank to form a cylindrical blank with a lapped side seam; and progressively compressing said side seam on said mandrel to heat seal said lapped ends together.

4. The method defined in claim 3, wherein said blank includes printed graphics on one face thereof including the step of orienting said blank such that said graphics appear on the outer circumferences of said cylindrical blank.

5. The method of forming heat-shrinkable cylindrical blanks from longitudinally oriented rolled lengths of foam plastic sheet material and heat shrinking said blanks to a predetermined cross-sectional configuration comprising:

feeding said lengths from a roll and cutting same into like rectangular blanks having said orientation in the longitudinal direction thereof;

conveying said blanks transversely of said longitudinal direction while progressively folding and advancing said blanks about and along an elongated cylindrical mandrel until the ends of said blanks overlap on said mandrel to form cylindrical blanks each having a longitudinal side seam defined by said overlap and with said orientation directed cicumferentially of each said blank;

applying heat to said ends of said blank during the advancement thereof along said mandrel;

applying pressure along said heated overlapped ends to seal said side seam and complete each said cylindrical blank on said mandrel; and ejecting said finished cylindrical blank from said mandrel subsequent to sealing said side seam;

transferring said cylindrical blank from the end of said mandrel synchronously onto individual second mandrels having the desired cross-sectional configuration; and shrinking said cylindrical blanks to the shape of said second mandrels.

6. The method of claim 5, wherein said shrinking of said cylindrical blank comprises continuously transporting said second mandrels through a zone of elevated temperature sufficient to shrink said blanks to the configuration of said mandrels during the time of transport through said zone.

7. The method of forming containers from heat shrinkable longitudinally oriented rolled lengths of foam plastic sheet material comprising:

feeding said lengths from a roll and cutting same into like rectangular blanks having said orientation in the longitudinal direction thereof;

conveying said blanks transversely of said longitudinal direction while progressively folding and advancing said blanks about and along an elongated cylindrical mandrel until the ends of said blanks overlap on said mandrel to form cylindrical blanks each having a longitudinal side seam defined by said overlap and with said orientation directed circumferentially of each said blank;

applying heat to said ends of said blanks during the advancement thereof along said mandrel;

applying pressure along said heated overlapped ends to seal said side seam and complete each said cylindrical blank on said mandrel; and ejecting each said finished cylindrical blank from said mandrel subsequent to sealing said side seam;

transferring said cylindrical blanks from the end of said mandrel synchronously onto individual second mandrels having a shape corresponding to that of the sidewall of a desired container configuration;

placing a bottom portion of plastic sheet material on said second mandrels prior to shrinking said cylindrical blanks;

shrinking said blanks onto said second mandrels and over at least to the peripheral portion of said bottom portion;

sealing the overlapped areas of said blank and said bottom portion to provide a closed bottom seam; and ejecting said container from said mandrel.

8. The method defined in claim 7 including the further step of forming annular rim configurations at the ends of said sidewalls to define mouths for said containers.

9. Means for forming a cylindrical blank from a rectangular blank of foam plastic sheet material comprising:

conveyor means feeding said rectangular blank along a predetermined path transversely of its length at a predetermined continuous rate;

cylindrical mandrel means positioned parallel with said predetermined path adjacent said conveyor means;

folding means adjacent said mandrel means over a portion of the length of the latter engaging and progressively folding said blank about said mandrel means while feeding said blank along said path to overlap the ends thereof on said mandrel in the provision of a lapped seam;

heating means adjacent said path for progressively applying heat to the ends of said blank to prepare said blank for heat sealing of said lapped seam; and sealing means adjacent said mandrel downstream of said folding means for pressing said heated ends of said blank together to heat seal said lapped seam.

10. The invention of claim 9 wherein said rectangular blank is stretch oriented in its longitudinal direction in the provision of a heat shrinkable foam blank; and wherein said orientation in said cylindrical blank is circumferentially disposed.

11. The invention of claim 9, wherein said rectangular blank is printed on one side thereof with a desired pattern; and
   wherein the other side thereof is placed adjacent the cylindrical mandrel when said blank is engaged by said conveyor means.

12. The invention defined in claim 9, wherein said rectangular blank is stretch oriented in its longitudinal direction in the provision of a heat shrinkable foam blank;
   wherein said orientation in said cylindrical blank is circumferentially disposed; and
   wherein said rectangular blank is printed on one side thereof with a desired pattern; and
   wherein the other side thereof is placed adjacent the cylindrical mandrel when said blank is engaged by said conveyor means.

13. The method of forming and filling containers with dispensed products on a continuous in-line basis comprising:
   forming said containers from heat shrinkable longitudinally oriented rolled lengths of plastic sheet material as follows:
   feeding said length from a roll and cutting same into lfike rectangular blanks having said orientation in the longitudinal direction thereof;
   conveying said blanks transversely of said longitudinal direction while progressively folding and advancing said blanks about and along an elongated cylindrical mandrel until the ends of said blanks overlap on said mandrel to form cylindrical blanks each having a longitudinal side seam defined by said overlap and with said orientation directed circumferentially of each said blank;
   applying heat to said ends of said blanks during the advancement thereof along said mandrel;
   applying pressure along said heated overlapped ends to seal said side seam and complete each said cylindrical blank on said mandrel;
   ejecting said finished cylindrical blank from said mandrel subsequent to sealing said side seam;
   transferring said cylindrical blanks from the end of said mandrel synchronously onto individual second mandrels having a shape corresponding to that of the sidewall of a desired container configuration;
   placing a bottom portion of plastic sheet material on said second mandrels prior to shrinking said cylindrical blanks;
   shrinking said blanks onto said second mandrels and over at least the peripheral portion of said bottom portion;
   sealing the overlapped areas of said blank and said bottom portion to provide a closed bottom seam;
   ejecting said container from said mandrel;
   forming an annular rim configuration on said containers;
   conveying said containers directly to a filling station;
   filling said containers with a measured amount of a product; and
   applying a cap to said containers;
   said container forming filling and capping operations all being synchronized to effect continuous forming and filling of said containers without storing same.

14. The invention defined in claim 13, including the further step of forming an interlock between said annular rim and said cap to maintain the latter on said container.

15. The method of forming and filling containers with dispensed products on a continuous in-line basis comprising:
   forming said containers from heat shrinkable longitudinally oriented rolled lengths of plastic sheet material as follows:
   feeding said lengths from a roll and cutting same into like rectangular blanks having said orientation in the longitudinal direction thereof;
   conveying said blanks transversely of said longitudinal direction while progressively folding and advancing said blanks about and along an elongated cylindrical mandrel until the ends of said blanks overlap on said mandrel to form cylindrical blanks each having a longitudinal side seam defined by said overlap and with said orientation directed circumferentially of each said blank;
   applying heat to said ends of said blanks during the advancement thereof along said mandrel;
   applying pressure along said heated overlapped ends to seal said side seam and complete each said cylindrical blank on said mandrel;
   ejecting each said finished cylindrical blank from said mandrel subsequent to sealing said side seam;
   transferring said cylindrical blanks from the end of said mandrel synchronously onto individual second mandrels having a shape corresponding to that of the sidewall of a desired container configuration;
   placing a bottom portion of plastic sheet material on said second mandrels prior to shrinking said cylindrical blanks;
   shrinking said blanks on said second mandrels and over at least to the peripheral portion of said bottom portion;
   sealing the overlapped areas of said blank and said bottom portion to provide a closed bottom seam;
   ejecting said container from said mandrel;
   conveying said containers directly to a filling station;
   filling said containers with a measured amount of a product; and
   applying a cap to said containers;
   said container forming filling and capping operations all being synchronized to effect continuous forming and filling of said containers without storing same.

16. The invention defined in claim 15, including the further step of forming an interlock between said annular rim and said cap to maintain the latter on said container.

17. Means forming two-piece containers from rectangular sidewall blanks and disc-shaped bottom blanks of thermoplastic sheet material comprising:
   conveyor means feeding a plurality of longitudinally stretch oriented rectangular blanks along a predetermined path transversely of the longitudinal dimension thereof;
   cylindrical mandrel means positioned parallel with said predetermined path adjacent said conveyor means;
   folding means adjacent said mandrel means over a portion of the length of the latter engaging and progressively folding said blank about said mandrel means while feeding said blank along said path to overlap the ends thereof on said mandrel in the provision of a lapped seam;
   heating means adjacent said path for progressively applying heat to the ends of said blank to prepare said blank for heat sealing of said lapped seam; and sealing means adjacent sadi mandrel downstream of said folding means for pressing said heated ends of said blank together to heat seal said lapped seam to provide a cylindrical blank on said mandrel;
a plurality of finishing mandrels;
conveyor means sequentially indexing said finishing mandrels into coaxial position with one end of said cylindrical mandrel means;
ejection means ejecting said cylindrical blanks from said cylindrical mandrel onto said finishing mandrels in synchronism with the said indexing of the latter with the former;
supply means providing a plurality of disc-shaped bottom blanks for said containers sequentially indexed with said finishing mandrels to supply bottom blanks thereto;
said finishing mandrels each comprising at least a sidewall and bottom portion for receiving said cylindrical and bottom blanks, respectively;
means retaining said bottom blanks on said bottom portion of said finishing mandrels;
a heat tunnel heated to a temperature sufficient to shrink said cylindrical blanks into conformal engagement with said sidewall portion and over the peripheries of said bottom blanks to form said two piece continers;
said conveyor means carrying said finishing mandrels bearing said cylindrical blanks and said bottom blanks through said heat tunnel;
bottom ironing means downstream of said heat tunnel means compressing said overlapped portions of said sidewall and bottom blank to seal the bottom of said two piece container;
and discharge means ejecting said container from said finishing mandrels downstream of said bottom ironing means.

18. The invention defined in claim 17, wherein said forming means further includes;
top curl forming means receiving said ejected containers from said discharge means, forming a top curl configuration thereon and ejecting said finished containers therefrom.

19. The invention defined in claim 17, wherein said forming means further comprises:
filling means for said containers;
capping means for said containers; and
second conveyor means receiving said ejected containers from said discharge means and conveying same through said filling and capping means;
all of said means being coordinated to provide continuous in-line forming, filling and closing of containers to preclude storage of the latter.

20. The invention defined in claim 17, wherein said conveyor means comprises:
an endless chain;
socket means driving and guiding said chain;
one said sprocket means having its axis of rotation substantially coincident with said one end of said cylindrical mandrel; and
support arms holding said finishing mandrels on said chain;
said support arms extending radially inward of said one sprocket means such that said finishing mandrel assumes and remains in a coaxial position with respect to said cylindrical mandrel and said sprocket means for a predetermined period of time to receive said cylindrical blanks thereon.

21. The invention defined in claim 17, wherein said supply means comprises:
a roll of strip stock;
rotary die means sequentially cutting bottom blanks from said roll of strip stock; and
rotary transfer means comprising turret means having peripherally spaced disc retaining means mutually indexed with said finishing mandrel means to transfer said bottom blanks from the former to the said bottom portion of the latter.

22. The invention defined in claim 17, wherein said means retaining said bottom blanks on said bottom portion of said finishing mandrels comprises:
vacuum ports formed in said mandrels extending through the surface of said bottom portion;
hose means connected with said vacuum ports;
a vacuum manifold means connected with said hose means;
a source of vacuum; and
porting means in said manifold means selectively interconnecting said source to said hose means to retain said bottom blanks on said finishing mandrels for a predetermined period of time.

23. The invention defined in claim 22, wherein said discharge means comprises:
a source of positive pressure; and
second porting means in said manifold means selectively interconnecting said source of positive pressure to said hose means to transmit pressure through said vacuum ports in said finishing mandrels to eject finished containers therefrom.

24. The invention defined in claim 17, wherein said bottom ironing means comprises rotary turret means adjacent said conveyor means;
ironing plate means peripherally mounted on said turret means for radial displacement thereon;
means indexing said ironing plates one with each said finishing mandrels; and
cam means driving said plate means into compressive engagement with said overlapped portions of said bottom sidewall and bottom blank.

25. The invention defined in claim 17, wherein said conveyor means comprises:
an endless chain;
sprocket means driving and guiding said chain;
one said sproket means having its axis of rotation substantially coincident with said one end of said cylindrical mandrel; and
support arms holding said finishing mandrels on said chain;
said support arms extending radially inward of said one sprocket means such that said finishing mandrel assumes and remains in a coaxial position with respect to said cylindrical mandrel and said sprocket means for a predetermined period of time to receive said cylindrical blanks thereon;
wherein said supply means comprises:
a roll of strip stock;
rotary die means sequentially cutting bottom blanks from said roll of strip stock; and
rotary transfer means comprising turret means having peripherally spaced disc retaining means mutually indexed with said finishing mandrel means to transfer said bottom blanks from the former to the said bottom portion of the latter.

26. The invention defined in claim 17, wherein said conveyor means comprises:
an endless chain;

sprocket means driving and guiding said chain;
one said sprocket means having its axis of rotation substantially coincident with said one end of said cylindrical mandrel; and
support arms holding said finishing mandrels on said chain;
said support arms extending radially inward of said one sprocket means such that said finishing mandrel assumes and remains in a coaxial position with respect to said cylindrical mandrel and said sprocket means for a predetermined period of time to receive said cylindrical blanks thereon; and
wherein said means retaining said bottom blanks on said bottom portion of said finishing mandrels comprises:
vacuum formed in said mandrels extending through the surface of said bottom portion;
hose means connected with said vacuum ports;
a vacuum manifold means connected with said hose means;
a source of vacuum; and
porting means in said manifold means selectively interconnecting said source to said hose means to retain said bottom blanks on said finishing mandrels for a predetermined period of time.

27. The invention defined in claim 26, wherein said discharge means comprises:
a source of positive presssure; and
second porting means in said manifold means selectively interconnecting said source of positive pressure to said hose means to transmit pressure through said vacuum ports in said finishing mandrels to eject finished containers therefrom.

28. The invention defined in claim 17, wherein said supply means comprises:
a roll of strip stock;
rotary die means sequentially cutting bottom blanks from said roll of strip stock; and
rotary transfer means comprising turret means having peripherally spaced disc retaining means mutually indexed with said finishing mandrel means to transfer said bottom blanks from the former to the said bottom portion of the latter; and
wherein said means retaining said bottom blanks on said bottom portion of said finishing mandrels comprises:
vacuum ports formed in said mandrels extending through the surface of said bottom portion;
hose means connected with said vacuum ports;
a vacuum manifold means connected with said hose means;
a source of vacuum; and
porting means in said manifold means selectively interconnecting said source to said hose means to retain said bottom blanks on said finishing mandrels for a predetermined period of time.

29. The invention defined in claim 28, wherein said discharge means comprises:
a source of positive pressure; and
second porting means in said manifold means selectively interconnecting said source of positive pressure to said hose means to transmit pressure through said vacuum ports in said finishing mandrels to eject finished containers therefrom.

30. The invention defined in claim 17, wherein said bottom ironing means comprises rotary turret means adjacent said conveyor means;
ironing plate means peripherally mounted on said turret means for radial displacement thereon;
means indexing said ironing plates one with each said finishing mandrels; and
cam means driving said plate means into compressive engagement with said overlapped portions of said bottom sidewall and bottom blank; and
wherein said means retaining said bottom blanks on said bottom portion of said finishing mandrels comprises:
vacuum ports formed in said mandrels extending through the surface of said bottom portion;
hose means connected with said vacuum ports;
a vacuum manifold means connected with said hose means;
a source of vacuum; and
porting means in said manifold means selectively interconnecting said source to said hose means to retain said bottom blanks on said finishing mandrels for a predetermined period of time.

31. The invention defined in claim 29, wherein said discharge means comprises:
a source of positive pressure; and
second porting means in said manifold means selectively interconnecting said source of positive pressure to said hose means to transmit pressure through said vacuum ports in said finishing mandrels to eject finished containers therefrom.

32. The invention defined in claim 17, wherein said conveyor means comprises:
an endless chain;
sprocket means driving and guiding said chain;
one said sprocket means having its axis of rotation substantially coincident with said one end of said cylindrical mandrel; and
support arms holding said finishing mandrel on said chain;
said support arms extending radially inward of said one sprocket means such that said finishing mandrel assumes and remains in a coaxial position with respect to said cylindrical mandrel and said sprocket means for a predetermined period of time to receive said cylindrical blanks thereon;
wherein said supply means comprises:
a roll of strip stock;
rotary die means sequentially cutting bottom blanks from said roll of strip stock; and
rotary transfer means comprising turret means having peripherally spaced disc retaining means mutually indexed with said finishing mandrel means to transfer said bottom blanks from the former to the said bottom portion of the latter; and
wherein said means retaining said bottom blanks on said bottom portion of said finishing mandrels comprises:
vacuum ports formed in said mandrels extending through the surface of said bottom portion;
hose means connected with said vacuum ports;
a vacuum manifold means connected with said hose means;
a source of vacuum; and
porting means in said manifold means selectively interconnecting said source to said hose means to retain said bottom blanks on said finishing mandrels for a predetermined period of time.

33. The invention defined in claim 31, wherein said discharge means comprises:
a source of positive pressure; and second porting means in said manifold means selectively interconnecting said source of positive pressure to said hose means to transmit pressure through said vacuum ports in said finishing mandrels to eject finished containers therefrom.

34. The invention defined in claim 31, wherein said bottom ironing means comprises rotary turret means adjacent said conveyor means;

ironing plate means peripherally mounted on said turret means for radial displacement thereon;

means indexing said ironing plates one with each said finishing mandrels; and cam means driving said plate means into compressive engagement with said overlapped portions of said bottom sidewall and bottom blank.

35. The invention defined in claim 33, wherein said discharge means comprises:

a source of positive pressure; and second porting means in said manifold means selectively interconnecting said source of positive pressure to said hose means to transmit pressure through said vacuum ports in said finishing mandrels to eject finished containers therefrom.

* * * * *